Sept. 17, 1957 R. HIGONNET ET AL 2,806,575
TYPE COMPOSING APPARATUS
Original Filed Aug. 23, 1947 5 Sheets-Sheet 1

INVENTORS
RENE HIGONNET
LOUIS MOYROUD
BY
ATTORNEYS

Sept. 17, 1957  R. HIGONNET ET AL  2,806,575
TYPE COMPOSING APPARATUS
Original Filed Aug. 23, 1947  5 Sheets-Sheet 2

INVENTORS
RENE HIGONNET
LOUIS MOYROUD
BY
ATTORNEYS

INVENTORS
RENE HIGONNET
LOUIS MOYROUD
ATTORNEYS

United States Patent Office 2,806,575
Patented Sept. 17, 1957

2,806,575

TYPE COMPOSING APPARATUS

Rene Higonnet, Cambridge, and Louis Moyroud, West Medford, Mass., assignors to Graphic Arts Research Foundation, Inc., Cambridge, Mass., a corporation of Delaware Original application August 23, 1947, Serial No. 770,320. Divided and this application May 13, 1954, Serial No. 429,504

Claims priority, application France March 20, 1947

7 Claims. (Cl. 197—84)

The present invention relates to type composition, and more particularly to composing apparatus adapted to justify the lines and to permit corrections of individual characters without affecting the exactness of the justification.

This application is a division of our copending application Ser. No. 770,320, filed August 23, 1947.

The principal object of the invention is to provide suitable apparatus to be associated with a manually-operated keyboard for determining the sizes of incremental spaces to be added to the normal spaces between the words in a line to justify it, that is, to cause the ends of the line to be flush with both the left and right margins of the page.

A further and related object is to permit correction of erroneously typed characters prior to the transcription of the line in final justified form, whereby the widths of such characters are subtracted from a counter which is associated with the justifier for determining the amount of space to be divided into increments in each line.

Other objects are to provide a justifier which utilizes components that are standard in the electrical arts, and to provide a justifier which is so designed as to provide results rapidly at the end of each line of typing so that the transcription of the line may be commenced without excessive delay.

With the above and other objects in view, the invention includes as one of its features a justifier composed of a number of stepping switches arranged to be "set up" at the end of each line of typing, and the contacts of which control the addition of justification increments at appropriate places in the line as the characters are successively transcribed from a temporary storage register.

The stepping switches are "set up" by means of an interword counter and a line counter, the latter of which is preset at the beginning of the typing of each line to indicate the desired justified width in convenient units, and moved each time a character key is struck by a number of steps corresponding to the width thereof. The widths of the various characters are variable in accordance with good printing practice.

Once the justifier stepping switches have been "set up" after the typing of the line, the number and sizes of the increments to be added to the line is determined, and transcription of the characters one-by-one begins. The resultant line is exactly justified, that is, there is never any net excess or deficit in the line length. If the quotient obtained by dividing the number of width units of initial deficit by the number of increments (or interwords) is not a whole number, this fact is automatically taken into account by a selection arrangement which varies the sizes of the increments in a given line to make the sum thereof exactly equal to the deficit.

Other features of the invention comprise certain embodiments, structures, and modes of operation which will be evident from the following description thereof, and from the appended claims.

In the accompanying drawings.

Figure 1:
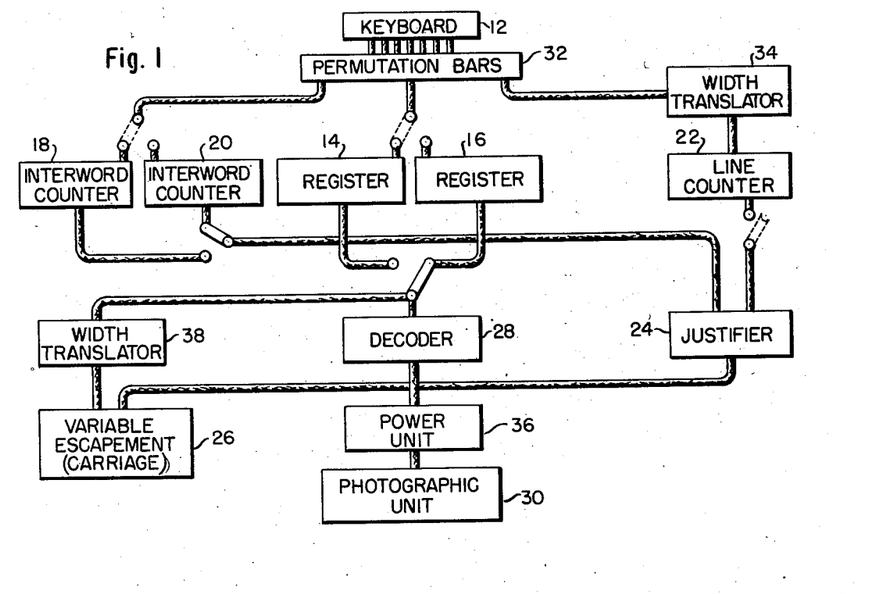
Fig. 1 is a block diagram of a photo-composing machine incorporating the invention.

Referring to Fig. 1, the described photographic composing machine embodying the invention is constructed in the same manner as fully described in said application Ser. No. 770,320. It comprises essentially seven units: the keyboard 12, the registers 14 and 16, the counters 18, 20, and 22, the justifier 24, the film carriage including the variable escapement 26, the decoder 28 and the photographic unit 30. The machine is operated by means of the keyboard 12 of a typewriter provided with permutation bars 32 which assign to each charcater one combination of a code, for instance a seven element code. Of these seven elements, a certain sub-combination represents the assigned width of the character, and all characters of equal width have identical width representing sub-combinations. Each character is thus characterized by a code combination which is stored in one of the registers 14 or 16. One line is recorded in a register associated with the typewriter platen. At the same time, the register on which the preceding line has been recorded, i. e., which has been severed from the typewriter, is associated with the photographic unit. The lines typed on keyboard 12 are therefore successively and alternatively stored in registers 14 and 16.

In order to make it possible to justify the lines, that is to say, increase the distance between words so as to bring all the lines to the same predetermined length, it is necessary to count the number of length units or elementary points comprised in each of the characters of the line as well as the number of interwords in the line. To this effect counters 18, 20 and 22 are provided. Counter 22 counts the number of length units occupied by each character or sign or interword, and counters 18 and 20 count the number of interwords in the line. Two interword counters are provided so that one of these counters controls the justifier while the other one records the number of the interwords of the line which is being stored. Counters 18 and 20 may be either successively and alternatively connected with the typewriter and with the photographic unit, or one of them may be permanently associated with the typewriter and used to set the other one in the proper position when the line is finished.

The characters used in printing work are of widely variable width and it is therefore necessary to move the counter 22 selectively. To this effect, this counter is controlled by a width translator 34, which will be later described in detail. A similar width translator is associated with the variable escapement 26 for the film carriage, upon which the characters in each line are successively projected from a fixed photographic position.

When one line has been stored for instance in register 16 the operator, after he has checked to make sure that there is no mistake, connects, through an appropriate control circuit (which may be operated automatically by the return of the platen of the typewriter) register 16 to decoder 28 to print photographically the stored line. The decoder 28 translates the code signals corresponding to the characters and, when the selected character passes in photographic position, operates a flash tube in the photographic unit 30 supplied by power unit 36. The sensitized film on the carriage is then moved by the variable escapement 26 through a distance proportional to the width of the character. This width is given by the width translator 38 which is similar to the translator 34.

All these different units are connected only by electrical wires, and may be arranged on a desk or otherwise conveniently assembled.

Storage of a line

As previously stated, the type composing machine according to the present invention includes a keyboard 12, for instance that of an electric typewriter. The employment of a typewriter as part of the organization enables the operator to read what he has typed and permits him to check whether each line is correct and to make the necessary corrections if needed before he gives the signal which sends the completed line to the photographic unit 30 to be photographed.

In order to make corrections possible and also to justify the lines, that is to say, equalize the margins, it is necessary that each line be recorded or stored in a special storage device 14 or 16. According to the described arrangement, which is the same as that described in said application Ser. No. 770,320, the storage device which is used has an element attached to the platen of the typewriter. In this way corrections may be easily effected and tabulation is made possible.

In order to simplify the register the characters are recorded in code arrangement by means of a small number of members or pins 40 which may each occupy two different positions. These recording elements may be flat sliding members as shown in said application and schematically illustrated in Fig. 2.

Figure 2:
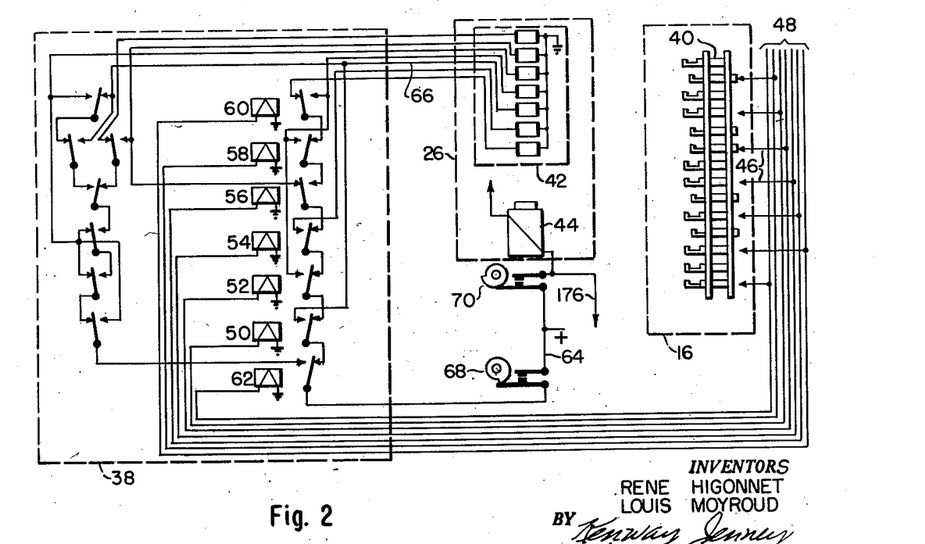
Fig. 2 is a schematic diagram illustrating the apparatus for spacing the characters as they are successively transcribed.

With $n$ members 40 it is possible to record $2^n$ different characters. It is customary in printing work to use 100 to 120 different characters in one font. To characterize such a number of characters seven recording members 40 must be used, which may record $2^7$, i. e. 128, combinations.

The code translating system associated with the typewriter keyboard for operating the register may comprise an arrangement of seven permutation bars or bails 32 as fully described in said application. These bars rotate about a shaft, and each bar, when depressed, pulls a lever and operates a set of contacts associated with one of the electromagnets of the register. As previously stated, a sub-combination of the bars, corresponding to a sub-combination of the pins 40 of the register, represents the character width. The permutation bars are provided with indentations so that these bars are selectively depressed by the typewriter key bars. The word space key bar has indentations which correspond to a width-representing sub-combination producing a normal interword space, which is automatically given whenever a word space is reached during transcription of the line.

In the preferred embodiment of the registering device as described in the above-mentioned application, the combination of displaced pins representing a line of characters is set by a group of seven hammers actuated by the above-mentioned electromagnets and following the displacements of the typewriter platen and travelling in front of a fixed frame provided with the sliding pins 40. The register is divided into three main groups or sections. The first, or "hammer" section, includes the seven hammers adapted to push from idle position into operative position a selection of the pins 40 while a line is being typed. This section includes also means for correcting erroneous settings, that is to say, means to erase a character, said means comprising hooked members, one for each hammer, adapted to reset the seven pins of the vertical row opposite the seven hammers. Correction feelers are also provided in this section for detecting the code arrangement of the pins before they are reset in order to subtract in the line counter a number of units corresponding to the width of the erased character as will be explained at length later. The hammer section follows all the displacements of the typewriter platen to which it is directly and rigidly connected.

The second or "storage" section comprises the vertically-arranged bank of pins 40 having as many vertical columns of pins as there are possible characters and spaces in a line, and twice as many pins in each column as are required to represent any single character. Odd pins in each column correspond to one register (e. g., 14) while even pins in the same column correspond to the other register (e. g., 16).

The third or "reading" section includes a carriage driven horizontally by a ratchet-and-pawl mechanism independently of the typewriter platen on the side of the storage section opposite to the hammer section. It is provided with seven feelers to sense either the even or odd pins 40 in each vertical column, and subsequently to reset said pins. As described in said application, the hammers and the feelers of the reading section are disposed on a rocking mechanism so that in one position of said mechanism the hammers are operatively disposed in relation to the odd storage pins of each column while the reading feelers are operatively disposed in relation to the even pins, and in the other position of said mechanism the hammers are opposite the even pins and the reading feelers opposite the odd pins. Thus, there are effectively two registers as designated by the reference numbers 14 and 16 in Fig. 1. The rocking mechanism is operated at the end of each line of typing by any suitable means as described in said application.

Variable escapement mechanism

The transcription of each successive character after the line has been typed is preferably carried out under the control of timing cams (Fig. 10) which bring about, first, a "photographic" cycle during which the character is photographed on the sensitized film while the latter is held stationary, and second, a "stepping" cycle during which the variable escapement moves the film carriage by a distance corresponding to the width of the character just projected. The driving shaft of the mechanism controlling the displacement of the sensitized surface carriage is keyed to a variable escapement mechanism 26 comprising mainly a toothed wheel fixed to the driving shaft and adapted for advancing it one, two or up to eight or more teeth at a time. This mechanism is the same as that described in detail in said application Serial No. 770,320, and includes a number of solenoids 42 (Fig. 2) operating pins disposed in a circle and selectively operable to stop a rockable member engageable with the toothed wheel. A motor magnet 44 is used to set the device in operation after the desired solenoid 42 has been selected.

The operation of the escapement mechanism is briefly described as follows:

When it is desired to move the escapement a number of teeth, the solenoid 42 corresponding to the required number of teeth is selectively operated, for example by the width translator 38 (Fig. 2), later described. In the example shown, seven solenoids are provided and adapted to give eight different possible displacements, the eighth and longest displacement being controlled by a fixed stop. The angular displacement of the toothed wheel subsequent to the operation of the motor magnet 44 is then of corresponding size. If, for example, it is wanted to rotate the wheel one tooth, the corresponding solenoid 42 will be energized and the associated stop pin projected in the path of the rockable member. The member is then released by operation of the motor magnet and rocked through a certain corresponding angle under the action of a spring, the rocking motion being stopped by the selected pin. As soon as the motor magnet is deenergized, the rockable member engages the toothed wheel. The latter wheel, which is fixed to the output shaft of the escapement, then rotates in the opposite direction under the urging of a stronger spring, and drives with it the rockable member. Both the wheel and the rockable member, on the completion of the identical displacement, are arrested by a fixed stop and the mechanism remains at rest, ready for a new operation.

The variable escapement mechanism may be adjusted in advance for each displacement. For instance, the electromagnets 42 may be energized during the photography of the characters, and the rockable member rocked to a corresponding position ready to let the toothed wheel escape a certain number of teeth according to the width of the letter which is being photographed. The motor magnet initiates the actual spacing movement during the stepping cycle when it is deenergized. This feature makes it possible to initiate the displacement of the carriage as soon as the photography is over, and leaves more time for this displacement since no time is lost in preparation for the movement. Moreover, since the displacement takes place immediately, the solenoid 42 controlling the selected stop may be deenergized as soon as the toothed wheel has started its movement. This feature is of value since it is thus possible to liberate the reading section of the register, almost immediately after the photographic cycle is over to prepare the circuit for the next character.

Width translator

As has been previously explained, the film carriage is moved selectively after a character has been photographed according to the width of said character. A chain of relays is used to actuate the selection stops of the variable escapement mechanism which has just been described. These relays are controlled by the register contacts. When the register moves one step, it prepare a new circuit for the decoder 28 controlling the exposure, and also operates the width translator relays.

Fig. 2 shows the circuit of this width translator. The register pins are shown at 40, as are the seven associated contacts 46 of the reading section of the register cooperating with the lower or odd pins on which the combination of an exemplary character to be printed is recorded. On one side wires 48 are connected to the decoder and on the other side to relays 50 to 62. The pins 40 control the relays 50 to 62. One pin corresponding to the "shift" key controls the operation of the relay 62. When relay 62 is at rest it switches a control wire 64 to the right contacts corresponding to lower case letters, and when it is operated it switches the control wire to the left contacts corresponding to upper case letters.

The combinations of the various characters are so chosen that characters of the same width have in common a sub-combination of the code elements, as previously explained. Whenever this sub-combination is present in a character combination the corresponding pin associated with the solenoids 42 of the variable escapement mechanism 26 is projected. For instance, it may be seen on the drawing that in the case of small letters when relay 62 is as shown, whenever relay 50 is operated to the opposite position from that shown, control wire 64 is connected to a terminal wire 66 of the variable escapement mechanism 26. Relay 50 is in the position opposite to that shown for all combinations in which the corresponding stop pin is involved, whatever may be the other elements of the combination.

The same control wire 66 will be energized for capital letters having two other combinations, as shown in the figure. It may be seen that there may be thirty-two small characters of width corresponding to the wire 66, since relay 50 is followed by five more relays. On the contrary, for capital letters, the possible sub-combination can control only one character since it leaves the last relay of the chain; the second combination can control only two characters, since in this case the control wire 66 is connected to the penultimate relay 58 of the chain. In the example shown there may be, therefore, 32 small letters and three capital letters of the particular width.

It is possible by this simple chain of relays to control all the stop members of the variable escapement mechanism 26. Cams 68 and 70 (see Fig. 10) are used to time the operation of the escapement. Cam 68 is closed first to actuate the selection pin while the machine is still in the photographic cycle; cam 70 is opened as seen as the photographic cycle is over and operates the motor magnet 44. Cam 68 is released shortly after cam 70 in order to avoid any false operation due to a premature release of the stop pin.

As subsequently pointed out, a second width translator relay circuit 34 (Fig. 1) similar to that just described is used in conjunction with the line counter 22.

Justification

The minimum value of the interwords must be increased if, as is customary in the printing art, both margins are equalized, or in other words, the lines justified. According to the present invention this result is obtained in a very simple manner by the use of apparatus employed for other purposes in automatic telephony. According to the method used, the typing of the line is stopped a little before its length reaches the "justification" leaving a deficit or "remainder" D. This remainder D is distributed between the interword spaces. The remainder D may be expressed in elementary length units, and the division of this number of units D by the number of interwords "$n$" is given by the equation:

$$q \times n + R = D$$

where "$q$" is the integral part of the quotient and "$R$" the rest of the division. When the remainder D is divided exactly by the number of interwords $n$, R is equal to zero. In this case each interword is increased by the same number of elementary intervals $q$, but when this division cannot be made exactly, that is to say, when there is a rest R, this rest R must be exhausted by distribution among some of the interwords.

Figure 6:
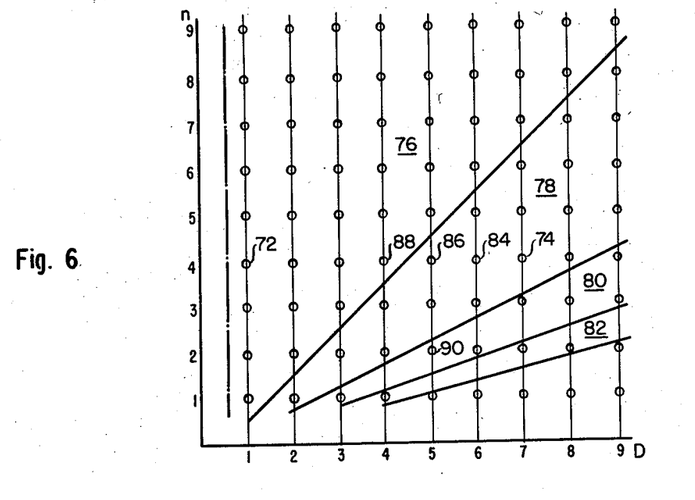
Fig. 6 is a diagram illustrating the method of justification.

The graph of Fig. 6 makes clear how this rest R is distributed. Any line which has not yet been justified is represented on the graph by two coordinates, the remainder D in abscissae and the number of interwords $n$ in ordinates. Thus, the point (1, 4) designated by the reference numeral 72 represents a line one unit too short with four interwords, the point (7, 4) designated 74 represents a line seven units too short with four interwords, and so on.

It may be seen on this graph that the loci of the lines for which the remainder is exactly divisible by the number of interwords are straight lines. For instance, the points representing lines (1, 1), (2, 2), (3, 3), (4, 4), (5, 5), (6, 6), (7, 7), (8, 8), and (9, 9), to which one unit must be added to each interword, are on a straight line. This is also the case for lines which need two units per interword, such as (2, 1), (4, 2), (6, 3), and (8, 4), and those needing three units per interword, such as (3, 1), (6, 2), and (9, 3). Since the graph has been limited to lines with a maximum of nine interwords and a maximum remainder of nine units, there are only isolated points for the other lines. These loci are used to divide the plane of the graph as shown in Fig. 6 into a number of different zones, 76, 78, 80 and 82. Zone 76 includes all lines which need at most one unit for each interword, zone 78 those needing at most two units for each interword, zone 80 those needing at most three units, etc. We shall call zone 76 the "one unit zone," zone 78 the "two unit zone," zone 80 the "three unit zone," etc.

Let us now consider the representative point of a line with, for instance, a remainder of seven units and four interwords. This is point 74 and it lies in the two unit zone 78, and the three consecutive points to the left on the same horizontal line are also in this zone. If we add to the four successive normal interwords additional length units characterized by the zone in which each of these consecutive points lies, it may be seen that the line is exactly justified. In the example chosen, the first point 74 lies in zone 78, the second point 84 in zone 78, the third 86 in zone 78, and the fourth point 88 in zone 76; and the following additional units will be added: first interword two units, second interword two units, third interword two units, fourth interword one unit, making altogether 2+2+2+1=7. The line is justified.

It may be checked that this applies to any representative point of the graph. For instance, a line with a remainder of one unit and four interwords is represented by point 72; and an additional unit will be added to the first interword only. A line five units too short with two interwords is represented by point 90 lying in zone 80. In this line, three units will be added to the first interword, and two units to the second interword, making a total of five.

It will be observed that the principle of the graph of Fig. 6 is the same as that involved in the justifiers described in our copending applications Ser. Nos. 244,841 and 244,842, both filed September 1, 1951, now Patent Nos. 2,678,712 and 2,678,713, respectively.

The graph of Fig. 6 may be drawn in polar coordinates with an equivalent procedure, as shown in said application Ser. No. 770,320. There are several possible embodiments of mechanisms for carrying out the method described above, both mechanical and electrical. These embodiments may be based on the rectangular or polar graphs.

One embodiment in which telephone switches are used will now be described, in relation with Fig. 7.

Figure 7:
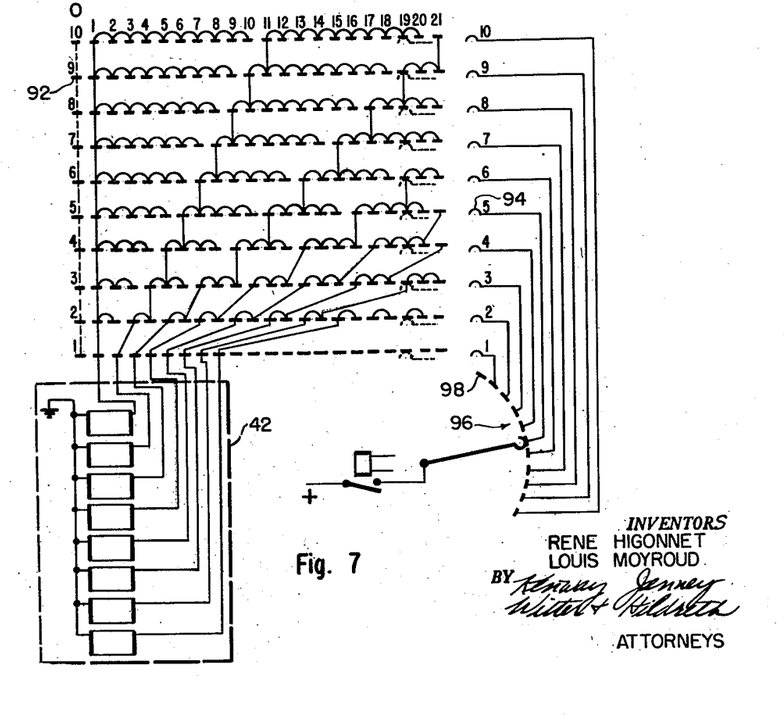
Fig. 7 is a schematic diagram of one form of the justifier.

Fig. 7 shows schematically a switch comprising as many terminal rows 92, numbered "1" to "10," as there may be interwords in a line, at most ten in this case. Each of these rows may comprise as many terminals as there may be elementary length units to distribute to complete the line, twenty in the case of the figure. Cooperating with these terminals are as many brushes 94, numbered "1" to "10," as there are different rows of terminals successively. The terminals are connected together so as to build up the zones of Fig. 6 as follows: terminals of row No. "2," two by two; those of row No. "3," three by three; those of row No. "4," four by four, and so on. The different groups in each row are then connected to the corresponding groups of the other rows as shown, beginning with the left hand side.

Each of the zones so constituted is connected to one of the control solenoids 42 of the variable escapement mechanism 26 of the film carriage to operate it when needed. The first zone is connected to the solenoid corresponding to a displacement of one unit, the second zone to that controlling the displacement of two units, and so on. There are in Fig. 7 eight such magnets 42, although only the upper seven are required for the example previously described under the heading "Variable Escapement Mechanism."

Brushes 94 are connected to the terminals of another switch 96 provided with as many terminals as there are brushes 94, that is to say, ten in the example shown. The brush of this switch 96 moves one step every time the operator depresses the spacing bar for an interword and thus counts the number of interwords from its initial position 98. When the line is completed this brush selects the brush 94 corresponding to the number of interwords in the line and connects it to the positive terminal of a battery. For example, for a line with five interwords and nineteen units too short, the brush of the switch 96 will stop in the position shown in the drawing and the corresponding brush 94 will be energized. This latter brush is in contact with terminal "19" of terminal row "5" as shown in dotted lines, since brushes 94 are adapted to move every time a character is typed by a number of steps corresponding to the width of said character, and their starting point from their initial or zero position is determined by the desired "justification." When the line is typed, they are therefore at a distance D steps from their "0" position. When the brush 94 on row "5" will be first energized, it will therefore operate the solenoid 42 to cause the film carriage to move four supplementary steps after the first interword. Immediately thereafter, brushes 94 move one step to bring the selected brush "5" to terminal "18," and for the second interword they operate the same solenoid 42 again since terminal "18" is also in zone "4." This same brush "5" will thus be successively in contact with terminals "19," "18," "17," "16," and "15." Terminals "19" to "16" are each connected to one solenoid 42 to produce 4 units of added space, and terminal "15" to another solenoid to produce 3 units of added space, so that the following additional units will be added:

$$4+4+4+4+3=19$$

The lines are thus justified with a maximum difference of one unit length between any interwords, and this is hardly noticeable.

It is clear that it is possible to use different types of switches to obtain the results as explained above. It is possible, for instance, to combine switches 96 and 94 in a single switch which is well known in the telephone art as a selector switch and is considered as equivalent for the purposes of the invention.

Figure 8:
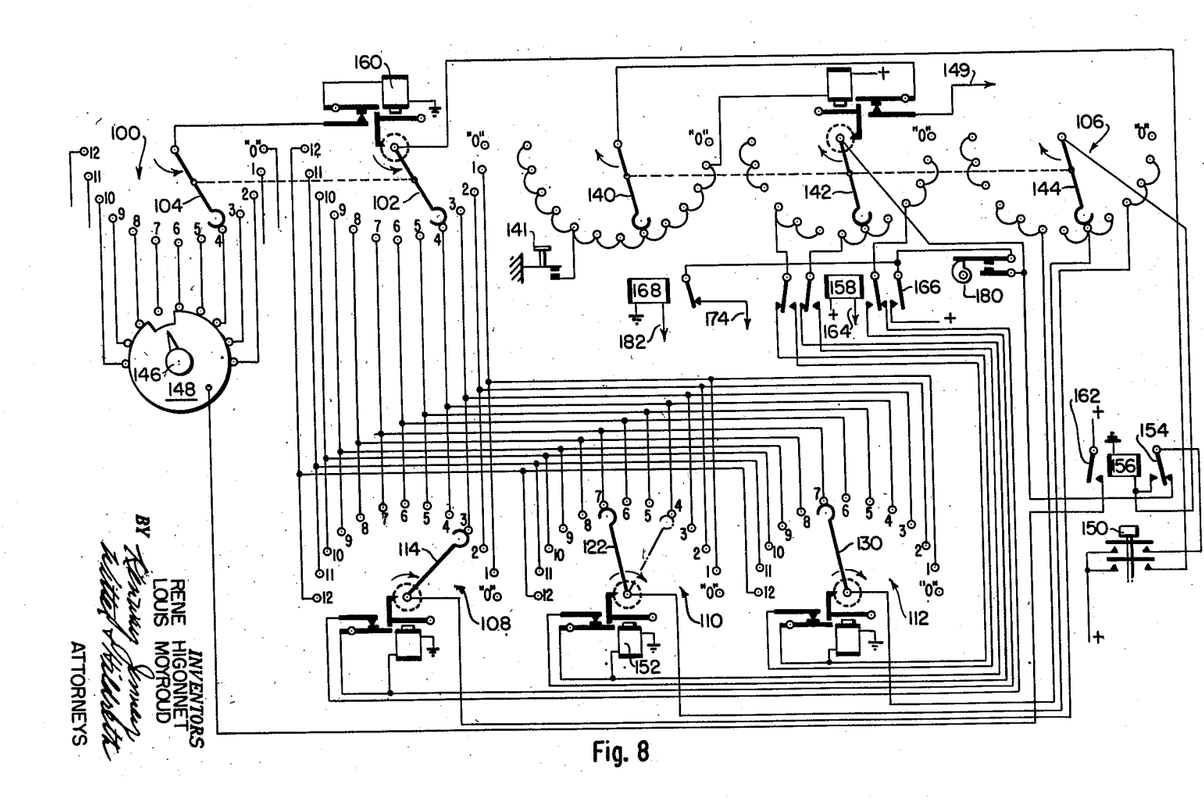
Figs. 8 and 9 are schematic diagrams to be read in conjunction with one another, illustrating a second embodiment of the justifier.
Figure 9:
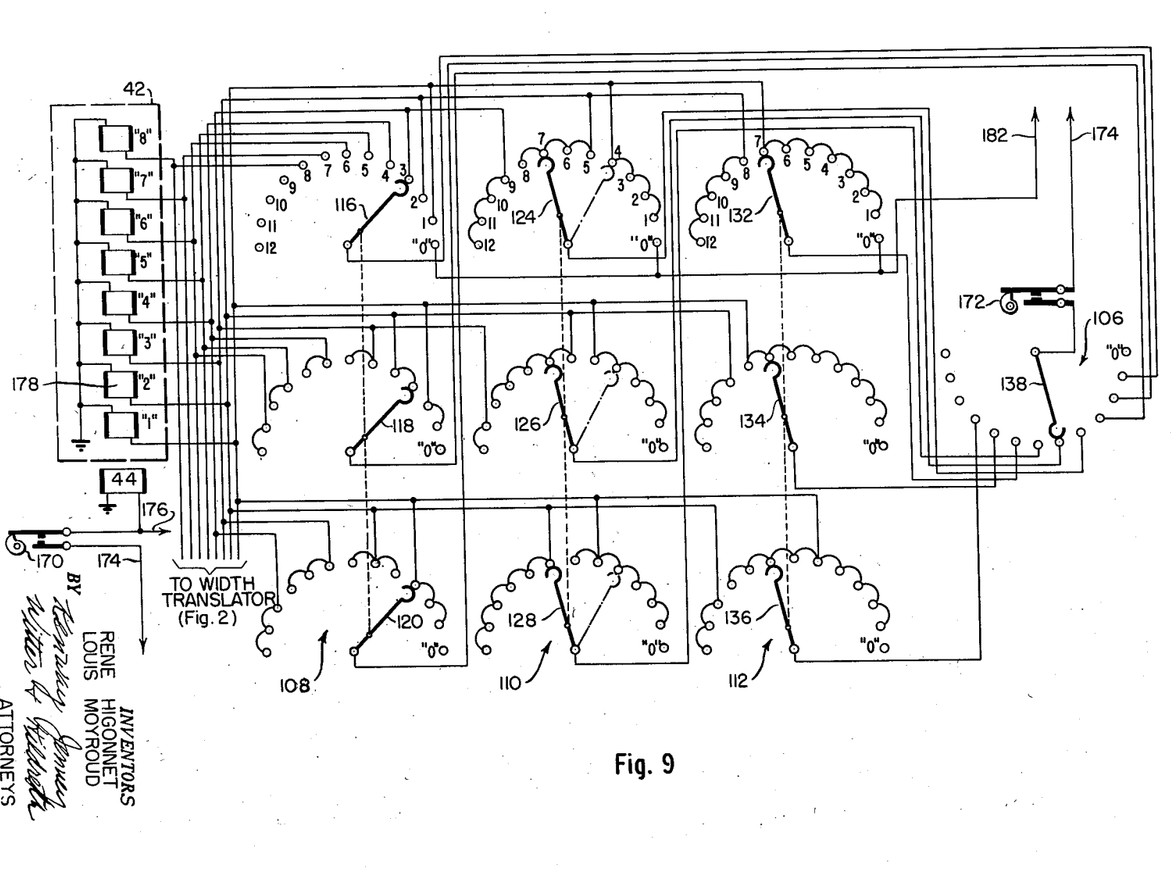

Another similar embodiment of the justifier is shown in Figs. 8 and 9.

The switches disclosed in Figs. 8 and 9 are of the type known as step-by-step switches. The two figures are to be considered simultaneously for a better understanding of the mechanism. For the sake of simplicity the different rows of terminals of the various switches have been shown side by side or one above the other, but it must be clear that the brushes of the same switch rotate simultaneously when the stepping magnet is energized.

The embodiment, as shown, comprises essentially:

(1) A step-by-step line counter 100 corresponding to the counter 22 of Fig. 1, which is provided with two brushes 102 and 104 cooperating with the typewriter. This switch moves every time a character has been typed by a number of steps equal to the number of length units in the said character and counts therefore the length of lines before justification.

(2) Two step-by-step switches or interword counters corresponding to the counters 18 and 20 of Fig. 1, of which only one, 106, is shown, since these counters are alternately connected to the keyboard and the justifier. It is also possible to use one switch to set up the other one on the desired position, when the line has been completed, this other switch being permanently connected to the justifier.

(3) The justifier proper comprising three step-by-step switches 108, 110 and 112. The number of switches used varies according to the maximum value of the remainder and the number of interwords. Each of them is provided with as many terminals as there are length units in the remainder D. In the embodiment shown in Figs. 8 and 9 the justifier switches are each provided with four brushes 114, 116, 118 and 120 for switch 108, 122, 124, 126 and 128 for switch 110, and 130, 132, 134 and 136, for switch 112. The three last brushes of each selector are shown on Fig. 9, and the rows corresponding thereto are similar to the rows 92 of Fig. 7.

The "home return" terminal rows scanned by brushes 114, 122 and 130 of the justifier are connected together and with the terminal row of line counter switch 100 swept by brush 102. After a line has been typed, the operator depresses a key which completes a circuit through the brush 102 to "set-up" the switches 108, 110 or 112 having the contact representing the particular line, as hereinafter explained. The terminal rows swept by brushes 116, 118, 120, 124, 126, 128, 132, 134 and 136 of the justifier switches are wired as explained with reference to Fig. 7.

Brush 138 of switch 106 (Fig. 9) operates in the same manner as switch 96 of Fig. 7.

The "home return" terminals swept by brush 140 of switch 106 are connected together. The first terminal "0" is left isolated and is the initial position of the brushes. A key 141 may be depressed at the beginning of each line to bring switch 106 to its initial position.

The terminals of the rows swept by brushes 142 and 144 are connected in groups, each group comprising as many terminals as the justifier swiches such as 108 have justification rows, such as those swept by brushes 116, 118 and 120, excluding the "home return" rows swept by the brushes 114, 122 and 130. These groups are equal in number to the number of justifier switches such as 108, 110 and 112.

As it has already been explained, the line switch 100 is operated when the line is being typed so as to count the widths of the characters. The starting positions of brushes 102 and 104 of this switch are such that if the line has exactly the desired length or "justification," these brushes 102 and 104 reach neutral terminals "0" of the switch. The starting point of brushes 102 and 104 is chosen a number of steps from terminals "0" equal to the number of units or points in the justified line, minus one or several times the total number of terminals of the switch. These brushes are brought into position by means of an electrical commutator called the "adjust justification" commutator 146. This commutator is provided with a conductive member 148 cooperating with a row of terminals, one for each possible justification, and such that only one terminal is left isolated, such as terminal "7" on the drawing. These terminals, cooperating with member 148 are connected to the terminals of a control row of switch 100 and will cause this switch to stop when brush 104 reaches this isolated terminal, since the stepping magnet of this commutator switch is thus open.

The interword switch 106 moves one step through energization of a wire 149 whenever the spacing bar of the typewriter is depressed, so that its brushes, which at the beginning of the line were on terminal "0," are at a distance from "0" equal to the number of interwords in the line when the line has been typed. When the operator is warned by a signal that the line is nearly completed and stops typing, brushes 102 and 104 are on terminals corresponding to the line deficit or remainder D. Brushes 142 and 144 of the interword counter switch 106 make contact with the terminals in the groups to which belong the justifier switches 108, 110 and 112 which correspond to the number of interwords. In the example shown, each justifier switch is provided with a "home return" row swept by the brushes 114, 122 or 130 and the three remaining rows are used for justification. The terminals of switch 106 cooperating with brushes 142 and 144 are connected together three by three as shown on the drawing. Therefore, for the lines comprising one to three interwords, the circuit of switch 108 is selected; for lines of four to six interwords switch 110 is selected and for the lines of seven to nine interwords switch 112 is selected.

When a line has been typed on the typewriter and the operator has checked that there is no mistake, he depresses a key 150 (Fig. 8) which controls the return movement of the typewriter platen. This key is maintained closed for a given length of time (by a device not shown) until the operations it controls have been completed. In the example illustrated by the position of the switch 106, key 150 connects the stepping magnet 152 of the step-by-step switch 110 to the positive terminal of a battery through the following circuit: upper contact of key 150, a back contact 154 of a relay 156, brush 142, a break contact of a relay 158, and ground. This stepping magnet 152 will therefore operate, open its contact and fall back, thus causing its armature to move the brushes 122 to 128 one step clockwise, and so on, until brush 122 reaches terminal "4" in the example shown, where it is stopped by the operation of relay 156 and the line counter switch 100 by the following circuit: battery, bottom contact of key 150, brush 102, terminal "4," brush 122, brush 144 and relay 156. Relay 156 operates and remains operated as long as key 150 remains closed. This relay opens contact 154 and stops therefore the stepping magnet 152 and brush 122 on terminal "4." On the other hand, relay 156 applies a battery current to the stepping magnet 160 of switch 100 through a contact 162 of relay 156, member 148, brush 104 of switch 100, a contact of the stepping magnet 160, and the winding of magnet 160. This stepping magnet operates and drives brushes 102 and 104 of switch 100 until brush 104 reaches the terminal corresponding to the justification setting "7" in the drawing. The magnet stops since the circuit is opened by the member 148.

It is seen that the operation of key 150, or a relay controlled by it, causes the following operations: first, setting of the selected justifier switch 108, 110 or 112 to a position corresponding to the line deficit or remainder in the line, and second, return of switch 100 to its initial position as set by the device 146.

Figure 10:
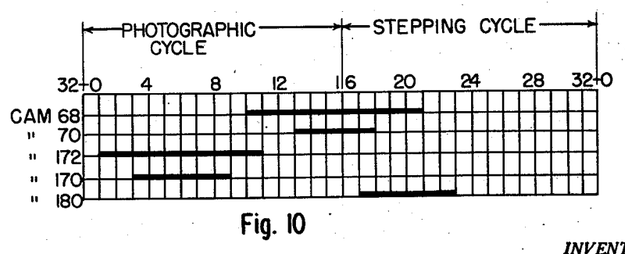
Fig. 10 is a continuing diagram explanatory of the timing relationships involved in the various machine operations.

The revolution during which the register moves has been called "stepping" or "idle" cycle in opposition to the "photographic" cycle or "active" cycle. When, after the last letter of one word has been photographed, the register moves to the next combination it finds the code combination corresponding to an "interword." This code signal is not used in the decoder 28 (Fig. 1), but is selected in a chain of relays similar to the translator chain 38 of Fig. 2. In fact additional contacts are provided to this effect in the chain of relays of Fig. 2. A relay is connected during the photographic cycle onto the control wire corresponding to this interword code combination and when this relay operates it connects a ground to a wire 164 (Fig. 8) and relay 158 to which it is connected. Relay 158 operates, and by its contact 166 applies a battery current through a rest contact of a relay 168 to a cam 170 and to a cam 172 by a wire 174, which appears in two places in Fig. 9. Cam 170 controls the motor magnet 44 of the variable escapement mechanism, which is shown also in Fig. 2, and cam 172 controls the selective stop pins associated with the solenoids 42 of the variable escapement mechanism through the justifier switches. A wire 176 appearing in Figs. 2 and 9 show the interconnection of these circuits. In the example shown by brush 138, terminal "5," and brush 126, cam 172 is connected to a solenoid 178, and prepares the variable escapement for a two unit displacement. This escapement will, however, operate only when cams 172 and 170 have closed their contacts during the "photographic" cycle as shown in Fig. 10. Instead of photographing a character, the film carriage moves the number of additional steps necessary for justification. The operation of cam 172 overlaps that of cam 170 to avoid any false operation.

On the other hand, relay 158 has also applied a battery current to a cam 180 which closes its contacts during the stepping cycle and applies a battery current to the stepping magnet 152 of switch 110. When the cam opens its contact, the magnet 152 falls back and moves brushes 122, 124, 126 and 128 one step. These brushes prepare a circuit for the next interword. During the stepping cycle, the film carriage is moved by the number of units allocated to a normal interword, determined by the translator chain of relays of Fig. 2, as previously explained. It will be noted that the code combination for an interword is such as to cause the width translator chain 38 to determine a minimum width value in every case.

It is to be noted, also, that during these two cycles two successive displacements of the film carriage have taken place; first, the additional displacement for the justification replacing the photographic cycle, and second, the normal displacement of an interword. It is clear that no displacement takes place in the first cycle when there are no additional spacings to distribute, either because the line has exactly the length of the justification or because the remainder has been previously completely exhausted. In this case the brushes of the justifier switch 108, 110 or 112 selected are on terminals "0." All terminals "0" of the row associated with brushes 116, 124 and 132 are connected by a wire 182 to relay 168 (Fig. 8) so that, as soon as the brush 116, 124 or 132 which is connected to a battery reaches one of these terminals "0," relay 168 operates and opens its contact, wire 174 is no longer connected to the battery, and no further additional displacement of the film carriage takes place.

Line counter

As explained previously under the heading "Justification," brushes 102 and 104 of the selector 100 stop when a line has been typed on the typewriter on a position depending on the number of length units D by which the line is too short.

The purpose of the line counter which is now to be described is to determine the position of the selector 100.

Figure 3:
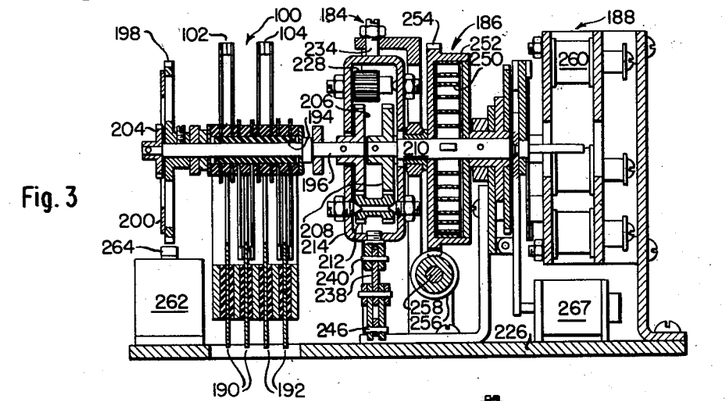
Figs. 3, 4 and 5 are various views of the apparatus for counting the widths of the successively typed characters prior to transcription.
Figure 4:
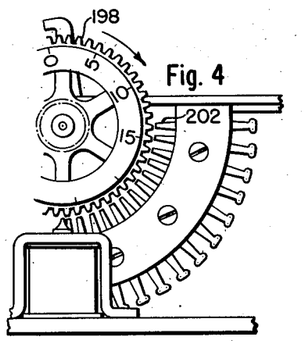
Figure 5:
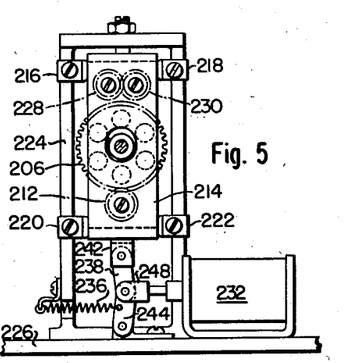

The line counter is shown in Figs. 3, 4 and 5 and comprises mainly the selector switch 100, the reversing mechanism 184, the spring motor 186 and the variable escapement mechanism 188. This latter may be of the type previously described under the heading "Variable Escapement Mechanism" and will not be described in detail here. This escapement controls the extent of displacement of the brushes of the selector, clockwise or counterclockwise as viewed in Fig. 8, according to the position of the reversing mechanism. In the embodiment illustrated, the selector 100 comprises the two brushes 102 and 104, composed each of two halves staggered so that they scan terminal rows 190 and 192 each comprising 25 terminals. In one revolution the result is the same as if a single brush had scanned 50 terminals.

These brushes are mounted on an insulating sleeve 194 keyed on a shaft 196. A spur wheel 198, having as many teeth as there are terminals in one complete circular row of the selector (50 in this example) is pinned on shaft 196 so that a lock can engage the wheel and center it exactly in a position in which the brushes rest on the center part of one terminal. A dial 200 is attached to wheel 198 and enables the operator to read, opposite a fixed index, for instance a neutral terminal 202, the number of points or length units separating the brushes from the neutral position. These points are counted clockwise in Fig. 4. A clock wheel 204 is also attached to shaft 196 for controlling another device (not shown) for counting the number of complete revolutions made by the brushes during the composition of a line. The reversing mechanism 184 comprises a driven wheel 206 keyed on shaft 196 and a driving wheel 208 keyed on a shaft 210. These wheels are normally engaged by a pinion 212 which drives wheel 206 in the same direction as the driving wheel 208.

Pinion 212 is pinned on a movable casing 214 which slides between guides 216, 218, 220 and 222, fixed on brackets 224 secured to base 226, and is movable upwards to free pinion 212 from wheels 206 and 208 and to engage with these wheels pinions 228 and 230. Pinion 228 meshes with wheel 206, its teeth extending nearly across the gap between wheels 206 and 208. Pinion 230 meshes in a similar manner with wheel 208 and at the center the two pinions mesh together. It is clear that when these pinions are engaged with the wheels—that is to say, when an electromagnet 232 (Fig. 5) is unenergized, wheel 208, by rotating in a clockwise direction as viewed in Fig. 5, will drive pinion 230 in a counterclockwise direction, and finally wheel 206 in a counterclockwise direction. The movement of the latter wheel is the reverse of that of the driving wheel 208.

In normal operation, the casing 214 is maintained in its upper position against a stop 234 by a spring 236 so that the wheel 206 and consequently the brushes 102 and 104 are driven clockwise as viewed on Fig. 4, or counterclockwise as viewed in Fig. 8. The casing 214 is supported by a lever 238, pivoted on a pin 240 engaged in a fork 242 fixed in the casing, said lever being also pivoted on one end of a lever 244, the other end of which is pivoted on a fixed pivot 246. A fork 248, on which both levers are pivoted, may be displaced to the right, as seen in Fig. 5 when solenoid 232 is energized. The latter is controlled by the "correction" key of the machine, hereinafter described, and remains energized throughout the correcting operations, to maintain the casing 214 in its lower position in which pinions 228 and 230 are out of mesh with the wheels to permit rotation of the brushes of the selector in the opposite from normal direction, that is to say in the direction of subtraction.

Shaft 210 is constantly urged in one direction by a clock spring 250, one end of the latter being attached to the shaft and the other end to a casing 252 capable of rotating freely on shaft 210 and provided with a toothed ring 254 cooperating wtih a worm gear 256 mounted on a shaft 258 controlled by a mechanism adapted to rewind it periodically (not shown). The rotation of shaft 210 is controlled by the variable escapement mechanism 188 which, when actuated, allows shaft 210 to rotate 1, 2, 3 . . . up to 8 points. The length of one point is such that, when the shaft 196 moves one step, the brushes rotate through the angle separating two consecutive terminals of the selector, so that the brushes move 1, 2 . . . up to 8 steps according to the stop member of the variable escapement mechanism which has been energized by a solenoid such as 260.

As explained previously, before a line is typed, the brushes 102 and 104 (Fig. 8) are set on the terminal corresponding to the desired justification. This terminal, in the example described, will be separated from the neutral terminal 202 (Fig. 4) by a number of steps equal to the remainder obtained by dividing by 50 the justification desired measured in points.

Assuming, for example, that Fig. 4 represents the position of the brushes at the starting of a line, this position corresponds to several justifications given by equation $14+(n\times 50)$, since the brushes have to move 14 steps to reach neutral terminal 202.

If Fig. 4 represents the position reached by the brushes after the typing of a line, it means that the typed line is 14 points short. The number of complete revolutions the brushes have made to count the length of the line is immaterial as far as the justification is concerned.

If a character has to be erased after the line has been typed, the counter is displaced in the direction opposite from normal by a number of points corresponding to the width of the erroneous character as will be explained in detail under the heading "Corrections." The reversal of direction is obtained by energizing the solenoid 232 (Fig. 5), which is controlled by the correction key.

In order to avoid shocks and jerks, brushes 102 and 104 are preferably driven by a resilient coupling (not shown) placed between the clock spring and the selector. This resilient coupling makes it possible to increase the speed of operation by enabling the variable escapement mechanism and the driving shaft connected thereto to be set in advance of the brushes. The speed is therefore not limited by the length of time necessary to move these brushes by the number of units corresponding to the widest characters.

In order to center the brushes exactly after the line has been typed a solenoid 262 may be used and energized to push forward a locking pin 264 engaging with wheel 198. The solenoid 262 may be energized either directly by the returning of the carriage or by a relay controlled by a key.

Corrections

The correction procedure will be described in relation to Figs. 3, 4, 5, 8 and 9. As explained previously, the brushes 102 and 104 of the line counter shown in Figs. 3, 4 and 8 may be rotated selectively in the normal counting direction shown by the arrows in Figs. 4 and 8, or in the reverse or subtracting direction.

When the operator notices an error, for example, if he has typed the letter "w" instead of "i," he displaces the platen of the typewriter so as to bring the faulty character into printing position exactly as an ordinary typist would do. This brings the register hammers, the correction feelers and the hooked resetting members opposite the rows of pins where the faulty character has been registered. He then depresses a suitable correction key which initiates a "correction cycle" of operations, as fully described in said application Serial No. 770,320. This key first energizes the reversing magnet 232 (Fig. 5) of the counter 100, and then operates the feelers to sense the positions of the register pins representing the faulty character. All the feelers finding an idle pin on their path (that is to say, not displaced during the typing) will be rocked and will subsequently open their associated contacts. A chain of relays similar to the chain 38 described under the heading "Width translator" and shown in Fig. 2, is thus energized. The operation of a given combination of this chain of relays has for its result the selection of one stop pin of the variable escapement 188 (Fig. 3). Another contact of the correction key then energizes the motor magnet 267 of the escapement, and the escapement moves a distance corresponding to the selected pin.

Since the reversing magnet 232 is energized, the brushes of the line counter 100 will move a number of steps backwards to subtract the width of the faulty character. A relay may be provided between the correction key and the motor magnet to give a certain delay between the operation of the motor magnet 267 of the variable escapement and an erasing magnet which then resets the operated pins back to rest position, as fully described in said application Serial No. 770,320.

The erroneous character has thus been erased and its width subtracted from the length of the line. The operator then types the correct letter.

It will be understood that the invention has been described with reference to an illustrated embodiment for the sake of clarity, and that certain modifications of structure, arrangement, procedure and design may be made therein according to known practices in the art without departing from the spirit or scope of the invention.

Having thus described the invention, we claim:

1. In apparatus for composing lines of written matter, a justifying device comprising, in combination, a number of mutiple-level stepping switches having consecutive contacts on each level representing units of remainder and a level for each possible number of increments, a line counter to count the widths of the selected characters and spaces in a given line and to measure the remainder therein, an interword counter to select the level of said switches corresponding to said line, means operative after the selection of the characters and spaces in said line to step the switch having said level to a position determined by the line counter, and spacing mechanism having provision for spacing the characters in a line in multiples of a unit distance having circuits for causing different sizes of incremental spacing, each circuit being connected to said levels, whereby the size of each increment in the line is determined by the circuit with which the selected contact of said level is connected.

2. In apparatus for composing lines of written matter, a justifying device comprising, in combination, a number of multiple-level stepping switches, said switches having consecutive contacts on each level representing units of remainder, a level for each possible number of increments, and interconnected circuits each representing a precomputed increment size corresponding to each of the possible combinations of line remainder and number of justification increments, selector means to select a level and contact corresponding to the units of line deficit and number of justification increments in a given line, and spacing mechanism having provision for spacing the characters in a line in multiples of a unit distance having circuits for causing different sizes of incremental spacing, each connected with one of said interconnected circuits, whereby the size of each increment in the line is determined by said selected level and contact.

3. In apparatus for composing lines of written matter, a justifying device comprising, in combination, a number of multiple-level stepping switches, said switches having consecutive contacts on each level representing units of remainder, a level for each possible number of increments, and interconnected circuits each representing a precomputed increment size corresponding to each of the possible combinations of line remainder and number of justification increments, selector means to select a level and contact corresponding to the units of line deficit and number of justification increments in a given line, spacing mechanism having provision for spacing the characters in a line in multiples of a unit distance having circuits for causing different sizes of incremental spacing, each connected with one of said interconnected circuits, whereby the size of each increment in the line is determined by said selected level and contact, and means for stepping the switch having said selected level over a predetermined path during the intervals between incremental movements, whereby the line is exactly justified.

4. In apparatus for composing lines of written matter, a justifying device comprising, in combination, a number of multiple-level stepping switches, said switches having consecutive contacts on each level representing units of remainder, a level for each possible number of increments, and interconnected circuits each representing a precomputed increment size corresponding to each of the possible combinations of line remainder and number of justification increments, selector means including an interword counter and a reversible line counter to select, respectively, a level and contact corresponding to the units of line deficit and number of justification increments in a given line, and spacing mechanism having provision for spacing the characters in a line in multiples of a unit distance having circuits for causing different sizes of incremental spacing, each connected with one of said interconnected circuits, whereby the size of each increment in the line is determined by said selected level and contact.

5. In apparatus for composing lines of written matter, a justifying device comprising, in combination, a number of multiple-level stepping switches, said switches having consecutive contacts on each level representing units of remainder, a level for each possible number of increments, and interconnected circuits each representing a precomputed increment size corresponding to each of the possible combinations of line remainder and number of justification increments, selector means including an interword counter and a reversible line counter to select, respectively, a level and a contact thereon corresponding to the units of line deficit and number of justification increments in a given line, said line counter being adapted to step the switch having the selected level to a selected contact after all the characters and spaces in the line have been selected, and spacing mechanism having provision for spacing the characters in a line in multiples of a unit distance having circuits for causing different sizes of incremental spacing, each connected with one of said interconnected circuits, whereby the size of each increment in the line is determined by said selected level and contact.

6. In apparatus for composing lines of written matter, a justifying device comprising, in combination, multi-level stepping switch means having consecutive contacts on each level representing units of remainder and a level for each possible number of increments, a line counter to count the widths of the selected characters and spaces in a given line and to measure the remainder therein, an interword counter to select the level of said switch means corresponding to said line, means operative after the selection of the characters and spaces in said line to step the switch means to a contact position determined by the line counter, and spacing mechanism having provision for spacing the characters in a line in multiples of a unit distance having circuits for causing different sizes of incremental spacing, each circuit being connected to the contacts of said switch means, whereby the size of each increment in the line is determined by the circuit with which the selected contact of said level is connected.

7. In apparatus for composing lines of written matter, a justifying device comprising, in combination, multi-level stepping switch means having consecutive contacts on each level representing units of remainder and a level for each possible number of increments, a line counter to count the widths of the selected characters and spaces in a given line and to measure the remainder therein, an interword counter to select the level of said switch means corresponding to said line, means operative after the selection of the characters and spaces in said line to step the switch means to a contact position determined by the line counter, spacing mechanism having provision for spacing the characters in a line in multiples of a unit distance having circuits for causing different sizes of incremental spacing, each circuit being connected to the contacts of said switch means, whereby the size of each increment in the line is determined by the circuit with which the selected contact of said level is connected, means for transcribing said line, and means for stepping said switch means alternately with the transcription of the characters to connect the contacts of said level successively with said circuits.

References Cited in the file of this patent

UNITED STATES PATENTS

| | | |
|---|---|---|
| 2,114,294 | Green | Apr. 19, 1938 |
| 2,379,862 | Bush | July 10, 1945 |